UNITED STATES PATENT OFFICE.

HENRY HARROP, OF GREENWICH, NEW YORK.

MODE OF ORNAMENTING.

Specification forming part of Letters Patent No. 46,354, dated February 14, 1865.

*To all whom it may concern:*

Be it known that I, HENRY HARROP, of Greenwich, county of Washington, and State of New York, have invented a new and Improved Mode or Process for Ornamenting and Decorating Articles of Manufacture, whether made of wood, metal, stone, glass, or other material; and I do hereby declare that the following is a full, clear, and exact description of the same, reference being hereby had to the compound or combination of material or ingredients used and more fully described hereinafter.

The nature of my invention or improvements consists in the mode or process herein described of giving any desired impression upon any article of manufacture by means of the ingredients herein named upon prepared tissue-paper, hereinafter described, and then transferring the same to the article to be ornamented or decorated.

To enable others skilled in the art to which my invention or improvement relates to make and use the same, I will here proceed to describe the compound or combination of ingredients and the mode or process and the operation, which are as follows, to wit:

I first prepare the stone to be used in lithographing in the ordinary form or manner used in different processes. I then take common tissue-paper and coat it over its entire surface by and with paste made of wheat-flour and water, or any kind of paste which will answer the same ends or purposes. Then I use a compound or combination of ingredients consisting of the following, to wit: first, copal varnish; second, litho-varnish; third, linseed-oil; and mix them well together in any proportion required to produce the effect desired. I then prepare the stone used in the process of lithographing in the ordinary way. I then trace in pencil upon the stone the desired design. The design is then coated with the composition of varnishes hereinbefore described. I then place the prepared tissue-paper upon the stone above described, coated, as aforesaid, and there and then take the desired impression. I then place upon the said tissue-paper so impressed bronzes, silver-leaf, gold-leaf, and metal leaf. I then prepare the article to be ornamented or decorated with sizing used by japanners, and called "japanners' gold size." I then place the tissue-paper so prepared and impressed upon the article so prepared to be ornamented and decorated, and then by carefully rubbing the paper so arranged upon such article the said sizing will receive the same design as that upon the said tissue-paper prepared as aforesaid. Then by dampening the said paper the same will become detached from the article so impressed, whereby the impression or design becomes perfect and permanent upon the said article desired to be ornamented or decorated.

In case I wish to give the article a burnished appearance or to do burnished gilding, I take the impression by the means and in the manner above described, and, in addition thereto, I sprinkle the said paper thus prepared with ground resin. Then I use a box of sufficient size to answer the required purpose. In the bottom of this box I place common brown paper, or any equivalent therefor, upon which I pour spirits of turpentine until the said paper becomes thoroughly saturated therewith. I then place in the same box the said tissue-paper thus prepared at a short distance above the said saturated paper or its equivalent, which is then held by means of a suitable rack in the said box. I then let the same remain for any desired length of time until the impression or design given to said paper in the manner aforesaid is brought to view in more clear, strong, and perfect manner by means of the fumes of said turpentine arising and coming in contact with the said resin. I then take the said tissue-paper thus prepared and place the same upon the article gilded by the use of "isinglass-water" before applying the said paper, after which I carefully rub the said tissue-paper with a cloth, by means of which the said paper becomes detached from the said gold, whereby the impression or design becomes permanent, as aforesaid. In all other cases I gild the paper and transfer the same to the article, which of course is ungilded.

Having thus described the nature and process of my invention, what I claim, and desire to secure by Letters Patent, is—

The mode or process, substantially as herein described and set forth, for ornamenting or decorating articles of manufacture.

In testimony whereof I have, on this 27th day of July, 1863, hereto set my hand.

HENRY HARROP.

Witnesses:
 MARCUS P. NORTON,
 THOS. INGALLS.